United States Patent [19]
Müller et al.

[11] Patent Number: 5,845,735
[45] Date of Patent: Dec. 8, 1998

[54] CONTROL ELEMENT ARRANGEMENT FOR CONTROLLING THE LONGITUDINAL MOVEMENT AND/OR THE LATERAL MOVEMENT OF A MOTOR VEHICLE

[75] Inventors: Manfred Müller, Nürnberg; Werner Reichelt, Esslingen; Peter Frank, Stuttgart; Christopher Rhoades, Herrenberg, all of Germany

[73] Assignee: Daimler-Benz AG, Stuttgart, Germany

[21] Appl. No.: 773,496

[22] Filed: Dec. 23, 1996

[30] Foreign Application Priority Data

Dec. 23, 1995 [DE] Germany .................. 195 48 717.6

[51] Int. Cl.⁶ .................................................. B60K 26/00
[52] U.S. Cl. ......................... 180/322; 180/323; 180/333
[58] Field of Search .................................. 180/315, 321, 180/322, 323, 324, 325, 333

[56] References Cited

U.S. PATENT DOCUMENTS

| | | | |
|---|---|---|---|
| 3,022,850 | 2/1962 | Bidwell et al. | 180/77 |
| 3,537,328 | 11/1970 | Allen | 74/481 |
| 3,939,726 | 2/1976 | Ahrens | 74/513 |
| 4,702,520 | 10/1987 | Whisler et al. | 297/417 |
| 5,042,314 | 8/1991 | Rytter et al. | 180/333 |
| 5,086,870 | 2/1992 | Bolduc | 180/133 |
| 5,566,586 | 10/1996 | Lauer et al. | 180/333 |

FOREIGN PATENT DOCUMENTS

| | | |
|---|---|---|
| 52-101710 | 1/1976 | Japan . |
| 56-149219 | 11/1981 | Japan . |
| 62-47473 | 3/1987 | Japan . |
| 2-147311 | 12/1990 | Japan . |
| 6-12130 | 2/1994 | Japan . |
| 583 837 | 1/1947 | United Kingdom . |
| 1073861 | 6/1967 | United Kingdom . |
| WO/85/03369 | 8/1985 | WIPO . |
| WO88/09279 | 12/1988 | WIPO . |

OTHER PUBLICATIONS

P. Bränneby et al., "Improved Active and Passive Safety by Using Active Lateral Dynamic Control and an Unconventional Steering Unit," 13th International Technical Conference on Experimental Safety Vehicles, Nov. 4–7, 1991 *Proceedings*, Voll. 1, p. 224.

H. Bugg, "Job Site–Driver, an Ergonomic Study," *Automobil–Industrie* Mar. 1985, p. 265.

Search Report Mar. 4, 1997 Great Britian.

*Primary Examiner*—J. Woodrow Eldred
*Attorney, Agent, or Firm*—Evenson, McKeown, Edwards & Lenahan P.L.L.C.

[57] ABSTRACT

A control element arrangement is disclosed for controlling a motor vehicle without conventional pedals and steering wheel. Two control elements are provided which can be operated independently of one another, in which case at least the longitudinal speed and/or at least the steering angle can be controlled optionally by operating one or the other control element. As a result, with respect to the longitudinal and/or the lateral dynamic control, on the one hand, a redundancy is created which increases the operating reliability and, on the other hand, the control-comfort-increasing possibility is created of being able to guide the vehicle alternately by means of one or the other control element.

15 Claims, 2 Drawing Sheets

CONTROL ELEMENT ARRANGEMENT FOR CONTROLLING THE LONGITUDINAL MOVEMENT AND/OR THE LATERAL MOVEMENT OF A MOTOR VEHICLE

BACKGROUND AND SUMMARY OF THE INVENTION

This invention relates to a control element arrangement for controlling the longitudinal and/or the lateral movement of a motor vehicle.

Conventionally, in an automobile, the steering wheel is used as the control element for controlling the lateral movement, and the accelerator pedal and the brake pedal are used as the control elements for controlling the longitudinal movement. It is known to use, instead of the steering wheel, a control lever which may be arranged, for example, on the transmission tunnel of the vehicle, as described in the article by P. Bränneby, et al., "Improved Active and Passive Safety by Using Active Lateral Dynamic Control and an Unconventional Steering Unit", 13th International Technical Conference on Experimental Safety Vehicles, Nov. 4 to 7, 1991, *Proceedings*, Vol. 1, Page 224.

Furthermore, it is known to provide a common control element for controlling the longitudinal and lateral dynamics of a motor vehicle, in which case, in an associative assignment of the operating function, preferably the longitudinal movement is controlled by an operating of the control element in the longitudinal direction of the vehicle and the lateral movement is controlled by an operating of the same in the lateral direction or analogously to the conventional steering wheel in a rotating direction. Such a control element is disclosed in U.S. Pat. No. 3,022,850 in the form of a control stick which is swivellable about a horizontal transverse axis disposed on a frame, in which case the frame, in turn, can be rotated about a horizontal longitudinal axis. Another control element of this type which is mentioned in the article by H. Bugg, "Job Site—Driver, An Ergonomic Study", *Automobil-Industrie* April 1985, Page 265, contains two plate-type handles which are mechanically connected with one another and are mounted on the end of a bow which is movably guided on the center console of the vehicle. By displacing the bow by way of the control element, the longitudinal dynamics are controlled, the displacement toward the front signifying a speed increase and the displacement toward the rear signifying a speed reduction. The lateral dynamics are influenced by the rotation of the two mechanically coupled, plate-type handles.

The invention is based on the technical problem of providing a control element arrangement of the initially mentioned type with a particularly high control comfort and a high operational reliability.

This problem is solved by means of a control element arrangement for controlling the longitudinal and/or the lateral movement of a motor vehicle, comprising two control elements which can be operated independently of one another, at least longitudinal movement or a steering angle of the motor vehicle being optionally controllable by operating one or the other control element. In this case, two control elements which can be operated independently of one another are provided such that of the two driving-dynamic components—longitudinal movement and lateral movement—at least one can optionally be controlled by operating one or the other control element. On the one hand, this provides a redundancy with respect to the control of the longitudinal and/or lateral dynamics of the vehicle which increases the operational reliability of the system. On the other hand, in the case of manually operated control elements, it is possible, while increasing the control comfort, to arrange the control elements such that one can be operated by one hand and the other can be operated by the other hand.

In the case of a further development of the invention wherein one control element is arranged on a transmission tunnel and the other control element is arranged on an interior side of a driver's door of an automobile, the driver can control the automobile with respect to the longitudinal and/or lateral movement very comfortably by way of each of the two control elements which are each situated in the immediate reach of the driver's left or right hand.

A further development of the invention provides for a third control element on an interior side of a front passenger's door of the automobile which can be operated independently of the two other control elements and whose operating functionality with respect to the control of the longitudinal and/or lateral movement of the automobile corresponds to that of the two other control elements. This development offers a cockpit concept in that, as the result of the additional third control element, it becomes possible also for the vehicle occupant sitting in the front passenger seat to control the automobile optionally with the left or the right hand on the respective control element with respect to the longitudinal and/or lateral movement.

A further development of the invention provides that at least one of the control elements is designed as a manually operable control stick and is carried by a console into which an armrest and/or an air bag is integrated. This arrangement provides the integration of an arm rest and/or of an air bag into a console by which at least one of the control elements is carried for controlling the longitudinal and/or the lateral movement of the vehicle.

A further development of the invention provides an arrangement wherein two of the control elements are designed as manually operable control sticks and are carried by the console and the console is mounted in the forward interior space area of an automobile in a longitudinally, laterally and/or vertically adjustable manner. This arrangement provides that the console can be arranged approximately in the area of an automobile in which conventionally the steering wheel is situated, in which case, by means of the left and the right hand, the user can hold the two control sticks carried by the console for controlling the longitudinal and/or lateral movement. A further development provides that the console is displaceable or swivellable between a driver's seat control position and a front passenger's seat control position. This permits a cockpit concept for such a console in that the console, together with the control sticks carried by it, for controlling the longitudinal and/or lateral movement of the vehicle, can optionally be brought into the area of the driver's seat or into the area of the front passenger's seat of the automobile.

In the case of a further development of the invention additional control functions and/or function elements are integrated into the control elements and/or the carrier console. In this arrangement, the control elements for controlling the longitudinal and/or lateral movement or the console carrying them have the purpose of receiving additional control functions and/or function elements, for example, also in the form of display elements.

According to a further development of the invention, at least one of the control elements, while maintaining its longitudinal speed and/or steering angle control function, can be removed from its vehicle-interior-side operating position and can be operated outside the motor vehicle. With this arrangement, at least one of the control elements for controlling the longitudinal and/or the lateral movement can be removed from the vehicle while maintaining its movement control function. This permits the controlling of the vehicle from the outside, for example, for the purpose of parking.

According to a further development of the invention the operating contact surfaces of the control elements can be heated and/or cooled and/or ventilated. This increases the using comfort in that the operating contact surfaces of the control elements for the longitudinal and/or lateral movement control of the vehicle are designed to be heatable and/or coolable and/or ventilatable so that the user always has a pleasant grip feeling when reaching around the control elements.

In a further development of the invention, the control elements are operationally coupled with one another, but can still be operated independently of one another; that is, the operating of one control element has an appropriate effect on the other control elements, for example, by a corresponding tracking of their position or by the adjusting of a resistance force against further deflection changes corresponding to that of the operated control element.

Other objects, advantages and novel features of the present invention will become apparent from the following detailed description of the invention when considered in conjunction with the accompanying drawings.

DETAILED DESCRIPTION OF THE DRAWINGS

Figure 1:
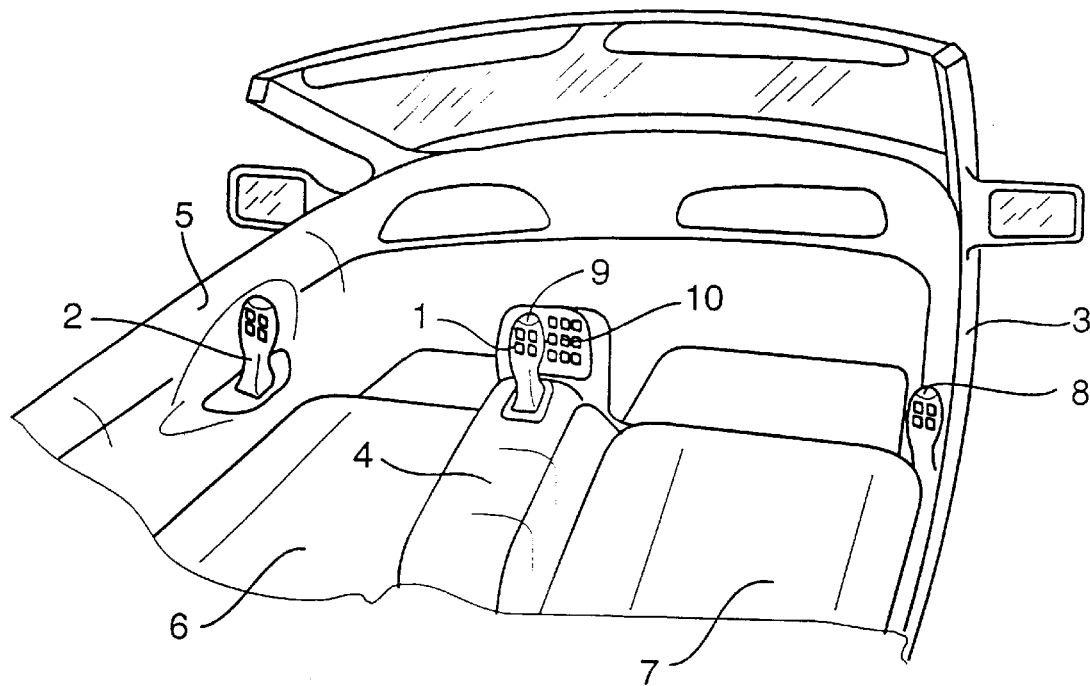
FIG. 1 is a schematic view of the forward interior area of an automobile with control sticks for controlling the longitudinal and lateral movement, constructed according to a preferred embodiment of the invention.

FIG. 1 is a view into the driver's and front passenger's area of a, for example, left-hand steered automobile which, while the conventional steering wheel and the conventional accelerator and brake pedals are eliminated, can optionally be controlled by means of one of three control sticks 1, 2, 3 in its longitudinal and lateral dynamics, that is, accelerated, decelerated and steered. A first control stick 1 is mounted in the forward area of a transmission tunnel 4, while a second control stick 2 is arranged within the reach of the left hand of an occupant sitting there in a recess on the interior side of the driver's door 5, as an alternative also in the pertaining left seat area. A vehicle driver sitting in the driver's seat 6 can therefore grip the first control stick 1 by means of his right hand and the left control stick 2 by means of his left hand. So that, for the implementation of a cockpit concept, the same possibility is offered to a vehicle occupant sitting on the front passenger's seat 7, symmetrically to the second control stick 2, a third control stick 3 is situated in a corresponding recess on the interior side of the front passenger door 8, which is outlined in FIG. 1 only schematically.

Each of the three control sticks 1, 2, 3 can be operated independently of the two others; however, as required, they are coupled with respect to their position or their force admission, in which case the admission of a forwardly directed operating force causes a longitudinal acceleration; an operating by means of a force directed toward the rear, causes a longitudinal deceleration; an admission of a force directed toward the left causes a steering angle toward the left; and an admission of a force directed toward the right causes a steering angle toward the right. It is clear that in this case suitable measures are taken by means of which command collisions between the different control sticks 1, 2, 3 are prevented. It can be provided, for example, to additively superimpose the control command signals of the various control sticks 1, 2, 3. As an alternative a manual switchability is conceivable by means of which a respective control stick is switched active or passive. In the case of a failure of a control stick recognized by the system, an automatic passive-switching of the control stick can be provided. Another possibility consists of classifying the control sticks 1, 2, 3 hierarchically with respect to their function so that a command of a lower-priority control stick is carried out only if no functionally corresponding command is present from a higher-priority control stick.

As required, the control sticks 1, 2, 3 can be heated, cooled or ventilated by way of corresponding ventilating slots so that the user can always grip a correctly tempered control stick and perspiration effects are prevented also after an extended reaching-around the control sticks 1, 2, 3. It is indicated only schematically that additional operating elements 9, such as push buttons, are integrated in the control sticks 1, 2, 3, in which case additional operating elements 10, as usual, are situated in the transmission tunnel forward area. As required, additional operating planes for the control sticks 1, 2, 3 for exercising additional functions can also be provided, for example, by means of rotating or lifting the control sticks 1, 2, 3.

Figure 2:
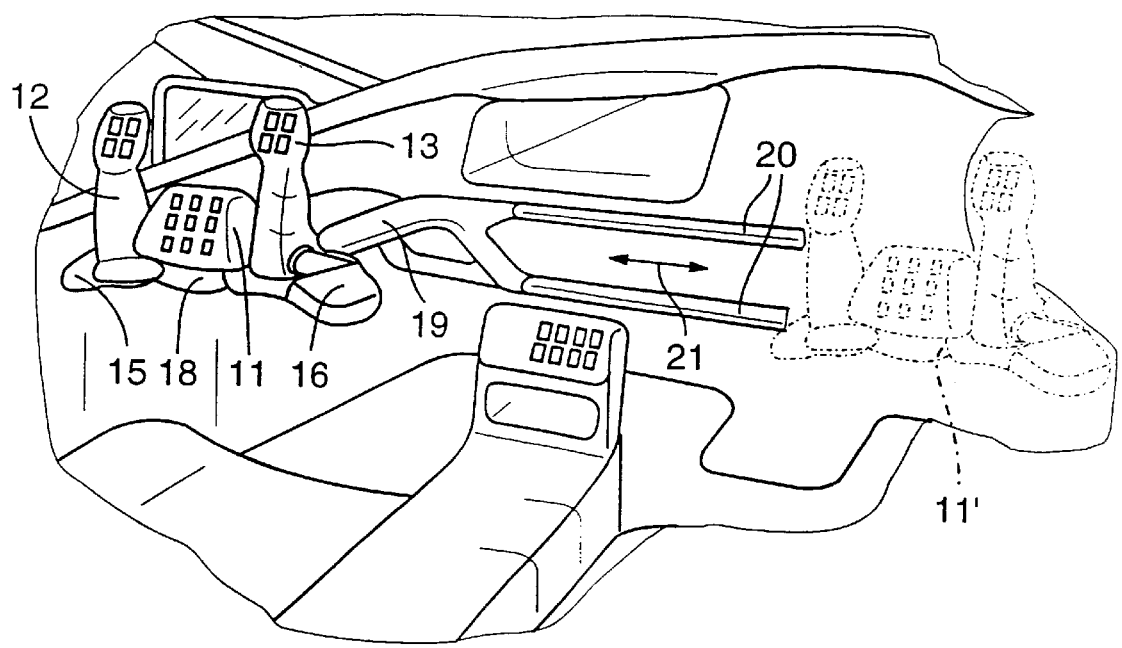
FIG. 2 is a schematic cutout of the forward interior area of another automobile with control sticks for the control of the longitudinal and lateral movement, constructed according to another preferred embodiment of the invention.
Figure 5:
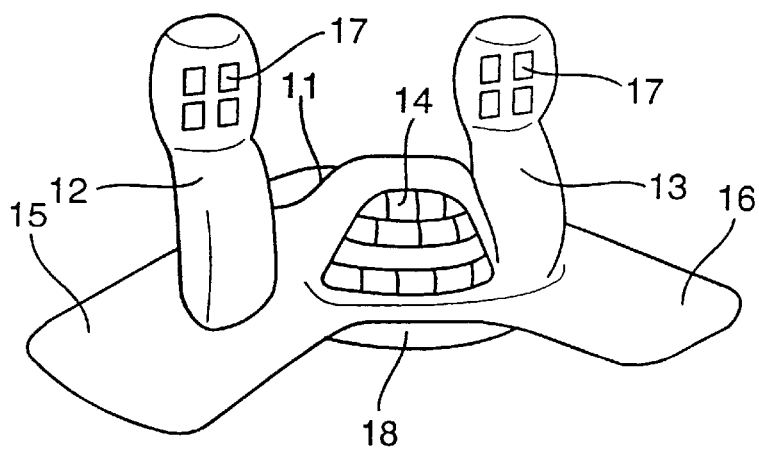
FIG. 5 is a schematic view of a carrier console with integrated armrests and an integrated air bag for holding two control sticks, such as depicted in FIG. 2, for controlling the longitudinal and lateral movement of a motor vehicle, constructed according to another preferred embodiment of the invention.

In the case of a variant illustrated in FIG. 2, a console 11 carries two control sticks 12, 13 which have the same functionality as the two control sticks 1, 2 of FIG. 1; that is, they can be operated independently of one another, in which case an operation in parallel to the longitudinal direction of the vehicle controls the longitudinal movement and an operation in the transverse direction controls the steering angle of the automobile equipped therewith. The console 11 is illustrated separately in FIG. 5, which shows that, between the two control sticks 12, 13, it has an operating and display field 14 in which display elements and operating elements, such a push buttons and the like, are situated. Laterally, the console 11 ends in each case with an armrest or a hand rest 15, 16 on which the vehicle driver can place his lower arms or hands when he reaches around the left control stick 12 by means of his left hand and around the right control stick 13 by means of his right hand. Additional operating elements 17 are housed in the control sticks 12, 13. In its center area below the operating and display field 14, the console 11 has an integrated air bag 18.

As illustrated in FIG. 2, the console 11 is fastened in a carrying arm 19, specifically preferably so that it can be longitudinally, transversely and/or vertically adjusted. The carrying arm 19 is transversely movably guided on a transverse guide rail 20 in the dashboard area, as symbolized by the double arrow 21. As a result, the console 11 with the two control sticks 12, 13 can be moved from the position in which it is situated approximately at the point of a conventional steering wheel in front of the left dashboard area, into a copilot position 11' so that the vehicle can be controlled in its longitudinal and lateral dynamics optionally by the left or the right front vehicle occupant which, in turn, implements a fully operable copilot concept for the automobile. Otherwise, the method of operation of the two control sticks 12, 13 corresponds completely to that of the arrangement described in FIG. 1. Likewise, the control sticks 12, 13 of FIGS. 2 and 5 can be equipped with the additional measures described concerning FIG. 1, such as the tempering capacity of the operating contact surfaces, etc.

Figure 3:
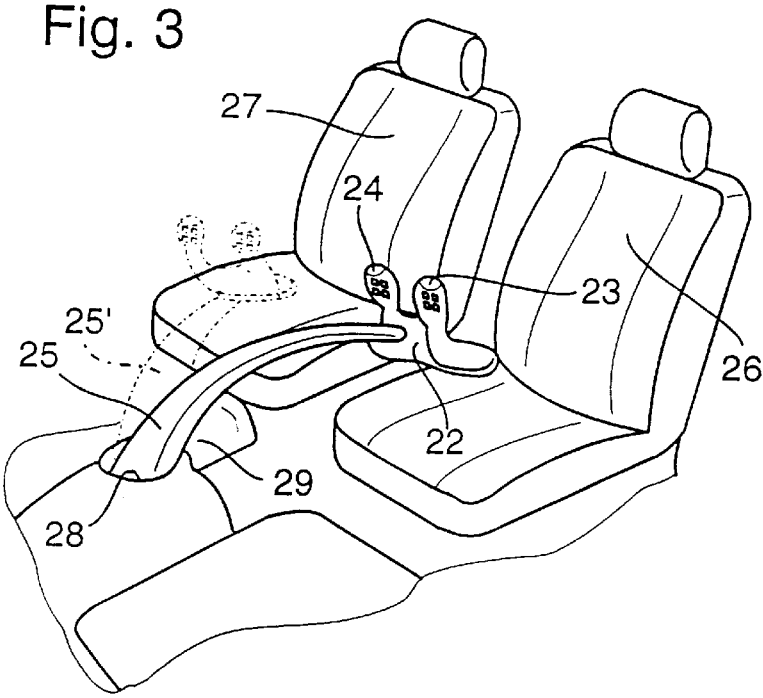
FIG. 3 is a schematic view of the forward seat group area of another automobile with control sticks for controlling the longitudinal and lateral movement, constructed according to another preferred embodiment of the invention.

Another copilot concept is illustrated in FIG. 3. In this arrangement, a console 22 of the type described with respect to FIGS. 2 and 5, carries a left 23 and a right control stick 24 for the optional, mutually independent operability for the purpose of controlling the longitudinal and lateral dynamics of the automobile equipped therewith, in which case the functionality and the characteristics of the two control sticks 23, 24 correspond to those 12, 13 of FIGS. 2 and 5. In this embodiment, the console 22 is fastened to a swivel arm 25 which can be swivelled from an operating position assigned to a driver's seat 26 into an operating position 25' assigned to a front passenger's seat 27, as illustrated schematically in FIG. 3. The two control sticks 23, 24 for controlling the longitudinal and lateral dynamics can therefore again be optionally operated by the left front or by the right front vehicle occupant. The bearing 28 for the swivel arm 25 is situated with respect to the longitudinal center of the vehicle in the lower dashboard area on the forward end of the transmission tunnel 29.

Figure 4:
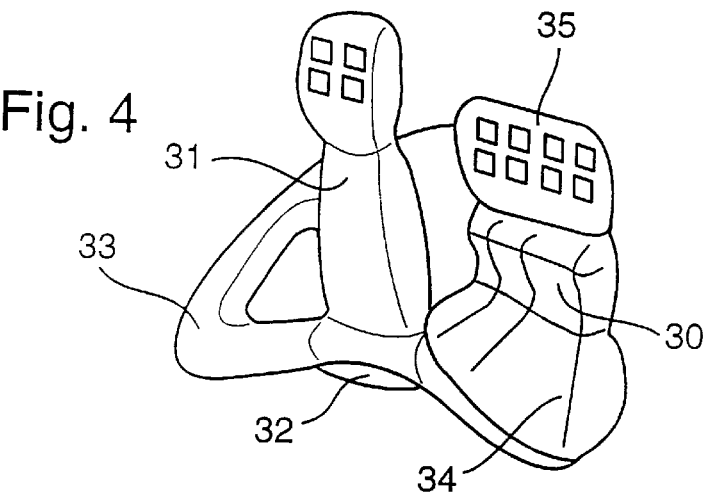
FIG. 4 is a schematic view of a carrier console with an integrated armrest and an integrated air bag for holding a control stick for controlling the longitudinal and lateral movement of a motor vehicle, constructed according to another preferred embodiment of the invention.

As another contemplated variant, FIG. 4 shows a console 30 which carries an individual control stick 31 for controlling the longitudinal and lateral movement of an automobile. The functionality and the characteristics of this control stick 31 correspond to those of the above-described control sticks of FIGS. 1 to 3 and 5. Below the control stick 31, an air bag 32 is integrated into the console 30, while the console side areas form arm rests 33, 34 so that the control stick 31 can be operated comfortably optionally by the right or the left hand. In an elevated center area of the console, a display and control field 35 is integrated. As the complete control element arrangement for controlling the longitudinal and lateral dynamics, two individual consoles 30 of this type can be suitably positioned in an automobile, for example, in each case, corresponding to the arrangements illustrated in FIGS. 2 and 3, or the one console 30 illustrated in FIG. 4 can be combined with the arrangement of another control stick directly on a center console or an interior door side corresponding to FIG. 1.

It is understood that, in addition to the described arrangements, other control element arrangements for controlling the longitudinal and/or lateral dynamics of a motor vehicle according to the invention can be implemented. It is in each case characteristic of these arrangements that two control elements, which can be operated optionally and independently of one another, are provided for the controlling the longitudinal and/or lateral movement. The resulting redundancy makes the controlling of the vehicle very reliable. In addition, it is possible for the user to guide the vehicle without fatigue in that he can alternate between the operations of the different control elements. In addition, among two control elements arranged in different areas, he can select the one whose position he likes best.

The control element arrangement for guiding the vehicle according to the invention represents a new ergonomic concept which clearly increases the active safety and, particularly because of the elimination of the conventional pedals and of the conventional steering wheel, the passive safety; which improves the handling of the vehicle; and contributes to reducing the weight and therefore the fuel consumption. In addition, the manufacturing expenditures are reduced because of the elimination of the steering wheel column tube. For the new control element concept for guiding the vehicle, accompanying measures may be provided, for example, with respect to the vehicle seats, such as measures on the seats for absorbing the longitudinal and lateral acceleration or coupled adjusting possibilities between the seat, on the one hand, and the control element or control stick, on the other hand. In addition, all or a large number of the control and display elements so far arranged on the dashboard, for example, for the illumination, the windshield wipers, the cruise control, the air-conditioning system, the radio, the seat adjustment, the window lift mechanisms, the navigation, etc., can be integrated in the vehicle guiding control elements or in the console carrying them.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Control element arrangement for controlling at least one of a longitudinal and a lateral movement of a motor vehicle, comprising:

spaced joy sticks adjacent a left hand and a right hand of a vehicle driver, and arranged to be operable independently of one another, wherein at least one of the longitudinal movement and a steering angle of the motor vehicle is optionally controllable by selectively operating each joy stick with the left hand or a right hand of a vehicle driver.

2. Control element arrangement according to claim 1, wherein one joy stick is arranged on a transmission tunnel and the other joy stick is arranged on an interior side of a driver's door of an automobile.

3. Control element arrangement according to claim 2, comprising a third joy stick on an interior side of a front passenger's door of the automobile configured to be operated independently of the two other joy sticks and whose operating functionality with respect to at least one of the control of the longitudinal and the lateral movement of the automobile corresponds to that of the two other joy sticks.

4. Control element arrangement according to claim 1, wherein at least one of the joy sticks is a manually operable joy stick operatively carried by a console into which at least one of an armrest and an air bag is integrated.

5. Control element arrangement according to claim 3, wherein at least one of the joy sticks is a manually operable joy stick operatively carried by a console into which at least one of an armrest and an air bag is integrated.

6. Control element arrangement according to claim 4, wherein at least one of additional control functions and function elements are integrated into at least one of the joy sticks and the carrier console.

7. Control element arrangement according to claim 1, wherein operating contact surfaces of the joy sticks are configured to be at least one of heated, cooled, and ventilated.

8. Control element arrangement according to claim 3, wherein operating contact surfaces of the joy sticks are configured to be at least one of heated, cooled, and ventilated.

9. Control element arrangement according to claim 1, wherein the joy sticks are operable independently of one another and are also operationally coupled with one another.

10. Control element arrangement according to claim 2, wherein the joy sticks are operable independently of one another and are also operationally coupled with one another.

11. Control element arrangement according to claim 4, wherein the joy sticks are operable independently of one another and are also operationally coupled with one another.

12. Control element arrangement according to claim 7, wherein the joy sticks are operable independently of one another and are also operationally coupled with one another.

13. A passenger vehicle control system comprising:
  a first manually operable control element operable to control longitudinal movement and lateral steering movement, and
  a second manually operable control element operable to control vehicle longitudinal movement and lateral steering movement,
  wherein said first and second control elements are optionally operable to thereby provide a selective and redundant control of the longitudinal movement and lateral steering movement of the vehicle using at least one of a left and a right hand of a vehicle occupant.

14. A passenger vehicle control system according to claim 13, wherein one control element is arranged on a transmission tunnel and the other control element is arranged on an interior side of a driver's door of an automobile.

15. A passenger vehicle control system according to claim 14, comprising a third control element on an interior side of a front passenger's door of the automobile configured to be operated independently of the other control elements and whose operating functionality with respect to the control of at least one of the longitudinal and the lateral movement of the automobile corresponds to that of the other control elements.

* * * * *